(12) United States Patent
Lönnqvist

(10) Patent No.: US 6,237,335 B1
(45) Date of Patent: May 29, 2001

(54) SUPERCHARGED COMBUSTION ENGINE, PREFERABLY OF DIESEL TYPE, PROVIDED WITH A DEVICE FOR EXHAUST GAS FEEDBACK

(75) Inventor: Tom Lönnqvist, Södertälje (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/367,241
(22) PCT Filed: Jan. 26, 1998
(86) PCT No.: PCT/SE98/00104
  § 371 Date: Aug. 10, 1999
  § 102(e) Date: Aug. 10, 1999
(87) PCT Pub. No.: WO98/35153
  PCT Pub. Date: Aug. 13, 1998

(30) Foreign Application Priority Data

Feb. 10, 1997 (SE) .................................................. 9700474

(51) Int. Cl.[7] .................................................. F02M 25/07
(52) U.S. Cl. .............................................................. 60/605.2
(58) Field of Search ............................................... 60/605.2

(56) References Cited

U.S. PATENT DOCUMENTS

| 5,791,146 | * | 8/1998 | Dungner ............................... 60/605.2 |
| 5,794,445 | * | 8/1998 | Dungner ............................... 60/605.2 |

FOREIGN PATENT DOCUMENTS

| 4231218 | 9/1993 | (DE) . |
| 0620365 | 10/1994 | (EP) . |
| 0 740 065 | * 10/1996 | (EP) ................................... 60/605.2 |
| 7-91325 | * 4/1995 | (JP) ................................... 60/605.2 |
| 9618031 | 6/1996 | (WO) . |

* cited by examiner

Primary Examiner—Michael Koczo
(74) Attorney, Agent, or Firm—Ostrolenk, Faber, Gerb & Soffen, LLP

(57) ABSTRACT

A supercharged combustion engine is provided with a device for exhaust gas feedback, so-called EGR, between the engine's outlet and its inlet. The device incorporates an exhaust gas driven turbine which drives a compressor which in its turn feeds exhaust gases, EGR, from the engine's outlet to its inlet. Valves situated respectively downstream and upstream from the compressor act on the EGR flow on the basis of parameters representing the engine's operating state so that desired EGR is obtained without unfavorable pressure distribution occurring across the compressor.

8 Claims, 1 Drawing Sheet

Figure 1:
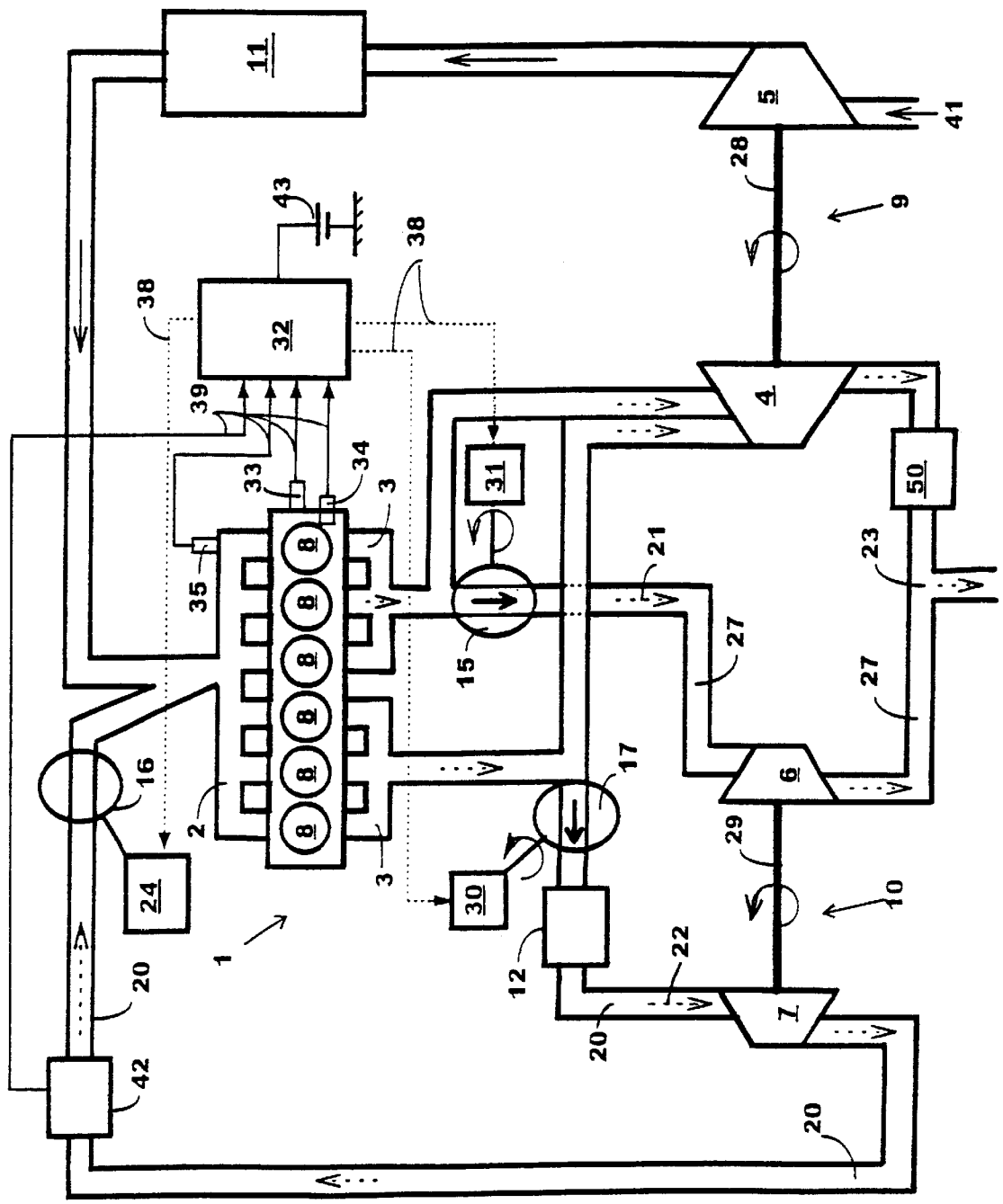

SUPERCHARGED COMBUSTION ENGINE, PREFERABLY OF DIESEL TYPE, PROVIDED WITH A DEVICE FOR EXHAUST GAS FEEDBACK

The present invention relates to a combustion engine of the kind including a supercharger in the inlet to the engine and a device for exhaust gas feedback to the engine inlet.

STATE OF THE ART

A combustion engine of the kind including a supercharger in the inlet system to the engine and including a first line from the outlet of the engine and a compressor in the first line for driving exhaust gases from the engine outlet to the inlet system to the engine and the compressor is driven by a turbine that is also situated in the outlet system, wherein valves control the flow of exhaust gas. This type of engine is particularly a diesel engine and is described in Swedish patent application SE 9404259-5, which describes the problem of returning exhaust gases to the engine inlet, so-called EGR, in the case of a supercharged engine. It states how the gas flow through the line which returns exhaust gases to the inlet side of the engine is controlled by a valve situated upstream from a compressor which drives the exhaust gases through the line. A turbine which drives the compressor supplies exhaust gases from the engine via a second line. The flow through this second line is controlled by a second valve. These valves are controlled by an engine control system which ensures that exhaust gas feedback takes place in desired operating conditions and that only under predetermined operating conditions is the turbine supplied with exhaust gases for driving it and hence for driving the compressor and the exhaust gas feedback. This known solution satisfies a desire for there to be, when the valve is closed, a small volume before the ordinary supercharger turbine in the exhaust system. This allows the engine to be provided with rapid response, meaning that gas mobilization is followed by a rapid increase in supercharging pressure and hence rapid acceleration. It also makes it possible for surplus energy in the exhaust gases to be effectively absorbed by the exhaust turbine. A disadvantage of this known solution is that the volume of the inlet system, even when the valve is closed, will be correspondingly larger, thereby adversely affecting engine response in the negative direction. Another more substantial disadvantage is that in circumstances when the valve is closed and the engine is at the same time run with supercharging, the supercharging pressure in the inlet system will be led back into the compressor, thereby subjecting it to an unintended overpressure. This overpressure will in its turn cause lubricating oil in the compressor to be pressed out into the exhaust system, with negative effects regarding exhaust emissions and the possibility of removing emissions from exhaust gases.

Further known technology is indicated by German patent specification DE-C-4231218, which states how in a combustion engine indicated in the introduction a valve is placed downstream from a compressor driving the exhaust gas feedback. The valve and hence the degree of exhaust gas feedback are controlled on the basis of engine parameters. In this case the exhaust system is of relatively large volume, thereby entailing the disadvantages indicated above regarding engine response.

Both of the known solutions also generally impose high requirements for the turbine and the compressor which effect the exhaust gas feedback. These two components are subject to severe pressure and temperature stresses, thereby reducing the possibility of providing sufficient lubrication to ensure good service life of these components and sufficient tightness to prevent oil reaching the exhaust system in such a way as to jeopardize the ability of the engine to meet established emission requirements.

OBJECT OF THE INVENTION

The object of the present invention is to provide a combustion engine as indicated in the introduction which reduces the aforesaid disadvantages of the known technology. The requirements imposed on the components which effect exhaust gas feedback have to be reduced so that the final solution becomes econonucally competitive. One essential purpose is to prevent on this basis any leakage of lubricating oil into the exhaust system due to the influence of the engine's supercharging pressure.

This is achieved by valves which control the exhaust gas feedback and also the exhaust gas flow for operating the turbine for the compressor. The provision of valves which control the flow through the exhaust gas feedback line both downstream and upstream from the compressor, and a valve which controls the exhaust gas flow to the turbine which drives the compressor which drives the exhaust gas feedback and the indicated control arrangement for these valves, makes possible a simpler and more reliable version of the device which effects the exhaust gas feedback. When the valves are closed, there is also assurance that the compressor will not be subject to the engine's supercharging pressure, which would entail risk of lubricating oil leaking out into the exhaust system. With the valves closed, the engine's inlet system and exhaust system will also be of smaller volume, thereby enabling the consequent advantages to be fully utilised.

In an advantageous embodiment, one of the valves in the exhaust gas feedback line is situated upstream from and close to a radiator for the exhaust gases fed back. This radiator is in its turn situated upstream from the compressor, thereby in aggregate making possible a relatively cool position for the valve while at the same time minimizing the dead volume in the first line which has to be filled before the turbine begins to run. This reduces reaction times in the exhaust gas feedback system.

Other features distinguishing the invention are indicated in the patent claims set out below and the following description of an embodiment distinguishing the invention. The description refers to the attached drawings.

LIST OF DRAWINGS

FIG. 1 shows schematically a system according to the invention for exhaust gas feedback in a turbocharged diesel engine.

DESCRIPTION OF AN EMBODIMENT

FIG. 1 depicts a turbocharged combustion engine 1, preferably of diesel type. The invention is also applicable to other types of engines in which exhaust gas feedback is hindered by the inlet pressure being greater than the exhaust pressure in operating states in which exhaust gas return is desired.

The supercharging of the engine is effected by a first turbo unit, hereinafter called the supercharger unit 9, in which a turbine 4 driven by exhaust gases and hereinafter called the supercharger turbine drives a compressor 5 hereinafter called the supercharger compressor. The supercharger turbine 4 and compressor 5 are coupled for joint rotation on a common drive shaft 28. In the diagram the inlet air flow is represented by unbroken flow arrows, whereas the exhaust gas flow is represented by discontinuous flow arrows.

The exhaust gases from the combustion engine are gathered in an exhaust manifold 3,3', which in this case is divided into two separate branches 3 and 3' respectively which connect to the inlet of the supercharger turbine 4. The supercharger turbine 4 is provided in a conventional manner with a so-called divided inlet run so that exhaust pulses from one group of engine cylinders will not impair the scavenging of the cylinders in the other group. In this embodiment the exhaust manifold 3,3' is used to represent all the components such as branch pipes, pipelines and the like which form part of the engine exhaust system for leading exhaust gases from the cylinders 8 to the supercharger turbine 4. Downstream from the supercharger turbine 4 there is also an exhaust brake 50, here of the damper valve type.

The inlet air manifold 2 of the combustion engine carries in a conventional manner to the engine's cylinders 8 the air pressurized in the supercharger compressor 5. In a likewise conventional manner a charge air cooler 11 is arranged downstream from the supercharger compressor 5 but upstream from the inlet air manifold 2. Moreover, the inlet side of the supercharger compressor 5 is supplied in a conventional manner with filtered air 41.

A second turbo unit 10, hereinafter called the EGR unit, is arranged in such a way that its turbine 6, hereinafter called the EGR turbine, can be provided with a first partial exhaust gas flow 21 in an exhaust gas duct 27 from the exhaust manifold 3,3'. The exhaust gas duct 27 thus provides a parallel connection of the EGR turbine 6 relative to the supercharger turbine 4. The partial exhaust gas flow 21 in the exhaust gas duct 27 thus bypasses the supercharger turbine 4. After passing through the EGR turbine 6, the partial gas flow 21 is led via the exhaust gas duct 27 to a junction point 23 where exhaust gases which have passed through the supercharger turbine 4 are mixed with the first partial exhaust gas flow 21 before being led on further via the exhaust system of the engine to a conventional silencer and any possible exhaust cleaning equipment (not depicted).

The EGR turbine 6 is coupled for joint rotation on a common shaft 29 with a compressor 7, hereinafter called the EGR compressor, in order to drive the latter. The EGR compressor 7 is intended to receive and pressurize a second partial exhaust gas flow 22, which is separate from the first partial exhaust gas flow 21, before it is led back to the engine's inlet air manifold 2. The EGR compressor 7 is arranged in an exhaust gas return duct 20 which connects the exhaust manifold 3,3' to the inlet air manifold 2.

The control of the EGR unit 10 is by means of three control valves 15, 16, 17, whereby the valve 15 controls the first partial exhaust gas flow 21 through the EGR turbine 6 and the valves 16 and 17 control the second partial exhaust gas flow 22 through the EGR compressor 7.

The valves 15, 16 and 17 incorporate control devices 31, 24 and 30 respectively which control the degree of opening of the valves, including their closure, in a conventional manner on the basis of signals from a control unit 32 for an electronic control system for the engine. The control unit 32 controls the control devices and hence the valves 15–17 on the basis of detected engine parameters such as engine speed, engine temperature and charge air pressure, which together represent the operating state of the engine. These parameters are detected by the control unit 32 via respective sensors 33, 34, 35 arranged on the engine. Moreover, a flow sensor 42, e.g. incorporating a venturi meter, in the line 20 downstream from the EGR compressor 7 gives the control unit 32 a signal representing the EGR quantity conveyed. This signal, like those representing the engine parameters at the time, are received by the control unit 32 via signal input lines 39. On the basis thereof the control unit 32 controls the control devices with signals via the dotted control lines 38. The control unit 32 is powered by a battery 43.

The control unit emits signals which represent the engine parameters and cause the valves 16 and 17 to prevent gas flow through the line 20 while the valve 15 allows gas to flow through the turbine 6.

The exhaust gases returning to the inlet side via the line 20 are conditioned by a radiator 12 arranged in the line 20 upstream from the EGR compressor 7, as seen in the direction of the returning partial exhaust gas flow. This positioning means that the increase in the temperature of the returning exhaust gases which takes place in the EGR compressor stage can be compensated by corresponding reduction in the radiator 12.

In operating states in which the engine is subject to excessive load, at least one of the sensors provides the control unit with an input signal which represents high charging pressure. At the same time, high pressure occurs in the outlet system, thereby to some extent compensating for the high charging pressure when exhaust gases are supplied to the inlet via the line 20. During high engine load there is a need to be able to feed exhaust gases back to the inlet side in order thereby to be able to reduce exhaust emissions.

The supply of exhaust gases to the inlet air affect the combustion inside the engine's cylinders so that the fuel quantity injected therein may burn at a lower temperature than would otherwise be the case. This effectively reduces the formation of nitrogen oxides, which constitute one of the exhaust pollution components which it is most important to reduce. In other words, during high engine load the valves 15–17 will be open to allow the maximum possible EGR.

In the event of no EGR, as when the engine load is low, neither of the valves 15 and 17 will be open. This means that should the valve 16 be open the inlet pressure will subject the EGR compressor 7 to a relatively high pressure via the line 20 downstream from the EGR compressor 7.

Nor does any EGR take place when the engine is subjected to exhaust braking, i.e. when the exhaust brake valve 50 throttles the exhaust gas flow downstream from the supercharger turbine 4. The fact that the line 27 debouches downstream from the exhaust brake 50 prevents a large pressure difference across the EGR turbine 6 and hence also prevents the EGR turbo unit being subject to risk of its lubricating oil being pressed out of its bearings by the exhaust pressure, with consequently inferior lubrication.

Such stresses on the EGR turbo unit can be substantially reduced by constructing the control program which via the control unit 32 controls the output signals to the control devices of the valves 15–17 so that these control devices open and close the valves 15–17 on the basis of the engine's operating state in the manner indicated above.

What is claimed is:

1. A supercharged combustion engine comprising:
   the engine having an inlet to the engine and having an outlet from the engine for exhaust gas;
   a system for exhaust gas feedback from the engine outlet to the engine inlet, the system comprising:
   an inlet system to the engine inlet; a turbo-type supercharger in the inlet system to the engine inlet;
   an exhaust gas line from the engine outlet; the exhaust gas line is divided into a first exit line from the engine outlet, a second exit line from the engine outlet, and a third exit line from the engine outlet, the third exit line being in parallel with the second exit line from the engine outlet;

a first compressor in the first exit line operable for driving exhaust gases from the engine outlet to the engine inlet;

a first turbine in the second exit line for driving the first compressor, the first turbine also communicating with the engine outlet to be driven by the exhaust gases in the outlet to, in turn, drive the first compressor;

the supercharger having a second turbine in the third line for driving the supercharger; an exhaust brake downstream of the second turbine in the third exit line;

a first valve in the first exit line upstream of the first compressor for acting on the exhaust gas flow through the first exit line and to the first compressor based on parameters of the engine operating state;

a second valve in the second exit line to the first turbine for acting on the exhaust gases to the first turbine based on parameters of the engine operating state;

a third valve in the first exit line downstream of the first compressor for acting on the exhaust gas flow through the first exit line based on parameters of the engine operating state;

a control system for the engine which transmits signals representative of parameters of the engine operating state for operating the first, second and third valves so that the first and third valves may prevent gas flow through the first exit line.

2. The engine of claim 1, wherein the engine is a diesel-type engine.

3. The engine of claim 1, wherein the first exit line is connected with the engine inlet, while the second exit line is not connected with the engine inlet.

4. The engine of claim 1, further comprising the inlet system to the engine being for delivery of air.

5. The engine of claim 1, further comprising a radiator in the exhaust gas line and the first valve being upstream of the radiator.

6. The engine of claim 1, wherein the third exit line communicates with the second exit line downstream of the exhaust brake.

7. The engine of claim 1, wherein the second valve is upstream in the second line from the first turbine.

8. The engine of claim 1, wherein the control system transmits such signals that while the first and third valves may prevent gas flow through the first exit line, the second valve allows gas flow through the exhaust gas turbine.

\* \* \* \* \*